(12) United States Patent
Iikawa

(10) Patent No.: US 6,876,499 B2
(45) Date of Patent: Apr. 5, 2005

(54) CAM MECHANISM

(75) Inventor: Makoto Iikawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/695,911

(22) Filed: Oct. 30, 2003

(65) Prior Publication Data
US 2004/0090682 A1 May 13, 2004

(30) Foreign Application Priority Data
Oct. 31, 2002 (JP) ........................................ 2002-318379

(51) Int. Cl.⁷ .............................................. G02B 15/14
(52) U.S. Cl. ........................ 359/699; 359/694; 359/704
(58) Field of Search ........................ 359/694, 699–701, 359/703–704, 823

(56) References Cited

U.S. PATENT DOCUMENTS 5,446,593 A    8/1995   Hamasaki et al.
5,731,913 A *  3/1998   Imanari .................... 359/700

FOREIGN PATENT DOCUMENTS

JP    8-146278    6/1996

* cited by examiner

*Primary Examiner*—Hung Xuan Dang
*Assistant Examiner*—Joseph Martinez
(74) *Attorney, Agent, or Firm*—Greenblum & Bernstein, P.L.C.

(57) ABSTRACT

A cam mechanism includes a cam ring including at least one cam rib which is formed on a peripheral surface of the cam ring to extend non-linearly; and a follower ring which is concentric with the cam ring, and includes at least one pair of cam followers which are formed on a peripheral surface of the follower ring to be positioned apart from each other in an axial direction of the follower ring to hold the cam rib between the pair of cam followers. Central positions of the pair of cam followers are offset from each other in a circumferential direction of the follower ring.

10 Claims, 6 Drawing Sheets

PRIOR ART

CAM MECHANISM

BACKGROUND OF THE INVENTION

1. Field of the Invention

The present invention relates to a cam mechanism which can be used in a lens barrel, e.g., a photographing lens of a camera. The cam mechanism includes a cam ring on which at least one cam rib is formed.

2. Description of the Related Art

A cam mechanism including a cam ring and a follower ring which are concentrically arranged, wherein at least one cam rib extending non-linearly is formed on an inner or outer peripheral surface of the cam ring while a corresponding at least one pair of cam followers are formed on an outer or inner peripheral surface of the follower ring, is known in the art. The present invention relates to this type of cam mechanism. This type of cam mechanism will be hereinafter referred to as a "cam-rib-incorporated cam mechanism". In the cam-rib-incorporated cam mechanism, if the primary cam diagram of the cam rib has only a circumferential component (i.e., if the primary cam diagram extends only in a circumferential direction of the cam ring), the pair of cam followers must be positioned apart from each other in the axial direction of the follower ring to hold the associated cam rib between the pair of cam followers. In other words, a pair of cam followers cannot hold the associated cam rib therebetween if positioned apart from each other only in a circumferential direction of the follower ring. The follower ring is usually guided linearly along the optical axis without rotating. Accordingly, rotating the cam ring forward and reverse causes the follower ring to move forward and rearward in the axial direction thereof.

In the cam-rib-incorporated cam mechanism, it is conventionally the case that the shapes of the opposite side surfaces of the cam rib are determined by a cam track delineated by paths of the associated pair of cam followers. Namely, the respective positions of the pair of cam followers are determined first, and thereafter the area between the paths of the associated pair of cam followers is determined as a representation of the shape of the cam rib.

In the cam-rib-incorporated cam mechanism, in the case where the ratio of the circumferential component of the cam rib to the axial component of the cam rib varies greatly (e.g., the case where the cam rib includes both an inclined rib section which is inclined to a circumferential direction of the cam ring at an angle of 45 degrees and a circumferential rib section which is not inclined to the same circumferential direction), the width of the cam rib varies greatly, which inevitably produces a narrow rib portion and a very wide rib portion in the cam rib. When the cam rib is molded out of synthetic resin to be integral with the cam ring, a portion of the cam rib can cause a shrinkage cavity to occur, which is produced if a liquefied synthetic resin cannot be injected sufficiently into a molding cavity for molding the cam rib, which has a greater width as viewed from outside (inside) of the cam ring. This deteriorates accuracy of the shape of the cam ring. In addition, in the case where the cam-rib-incorporated cam mechanism is incorporated in a lens barrel such as a photographing lens, an increase in width of the cam rib increases the axial length of the cam ring. This is disadvantageous in regard to reducing the length of the lens barrel.

SUMMARY OF THE INVENTION

The present invention provides a cam-rib-incorporated cam mechanism which makes it possible to reduce the variation of the width of the cam rib even if the cam rib includes a rib portion having almost only a circumferential component.

The present invention has been devised from the idea that the width of the cam rib can be made to be narrower than before if the associated pair of cam followers are offset from each other in a circumferential direction of the cam ring on which the pair of cam followers are formed.

According to an aspect of the present invention, a cam mechanism is provided, including a cam ring including at least one cam rib which is formed on a peripheral surface of the cam ring to extend non-linearly; and a follower ring which is concentric with the cam ring, and includes at least one pair of cam followers which are formed on a peripheral surface of the follower ring to be positioned apart from each other in an axial direction of the follower ring to hold the cam rib between the pair of cam followers. Central positions of the pair of cam followers are offset from each other in a circumferential direction of the follower ring.

It is desirable for the cam rib to be formed on an outer peripheral surface of the cam ring, and the pair of cam followers to be formed on an inner peripheral surface of the follower ring.

It is desirable for the cam rib to be formed on an inner peripheral surface of the cam ring, and the pair of cam followers to be formed on an outer peripheral surface of the follower ring.

It is desirable for the follower ring to be molded from synthetic resin, the pair of cam followers being molded to be integral with the follower ring by a common mold.

It is desirable for the cam ring and the follower ring to be elements of a lens barrel, the follower ring being guided linearly along an optical axis of the lens barrel without rotating.

The lens barrel can include a linear guide member having at least one linear guide groove for guiding the follower ring linearly along the optical axis without rotating the follower ring, the pair of cam followers being formed on an end of a linear guide projection which is engaged in the linear guide groove.

It is desirable for the lens barrel to serve as a photographing lens.

The cam rib can include an inclined straight section which extends in a direction inclined to both a circumferential direction of the cam ring and an axial direction of the cam ring, and a circumferential section which extends in substantially the circumferential direction of the cam ring.

In another embodiment, a cam mechanism is provided, including two concentric rings, at least one of which is rotatable relative to the other; at least one cam rib formed on one of opposed peripheral surfaces of the two concentric rings; at least one pair of cam followers formed on the other of the opposed peripheral surfaces to hold the cam rib between the pair of cam followers, wherein central positions of the pair of cam followers are offset from each other in a circumferential direction of the two concentric rings.

It is desirable for the cam mechanism to be incorporated in a photographing lens.

The present disclosure relates to subject matter contained in Japanese Patent Application No. 2002-318379 (filed on Oct. 31, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
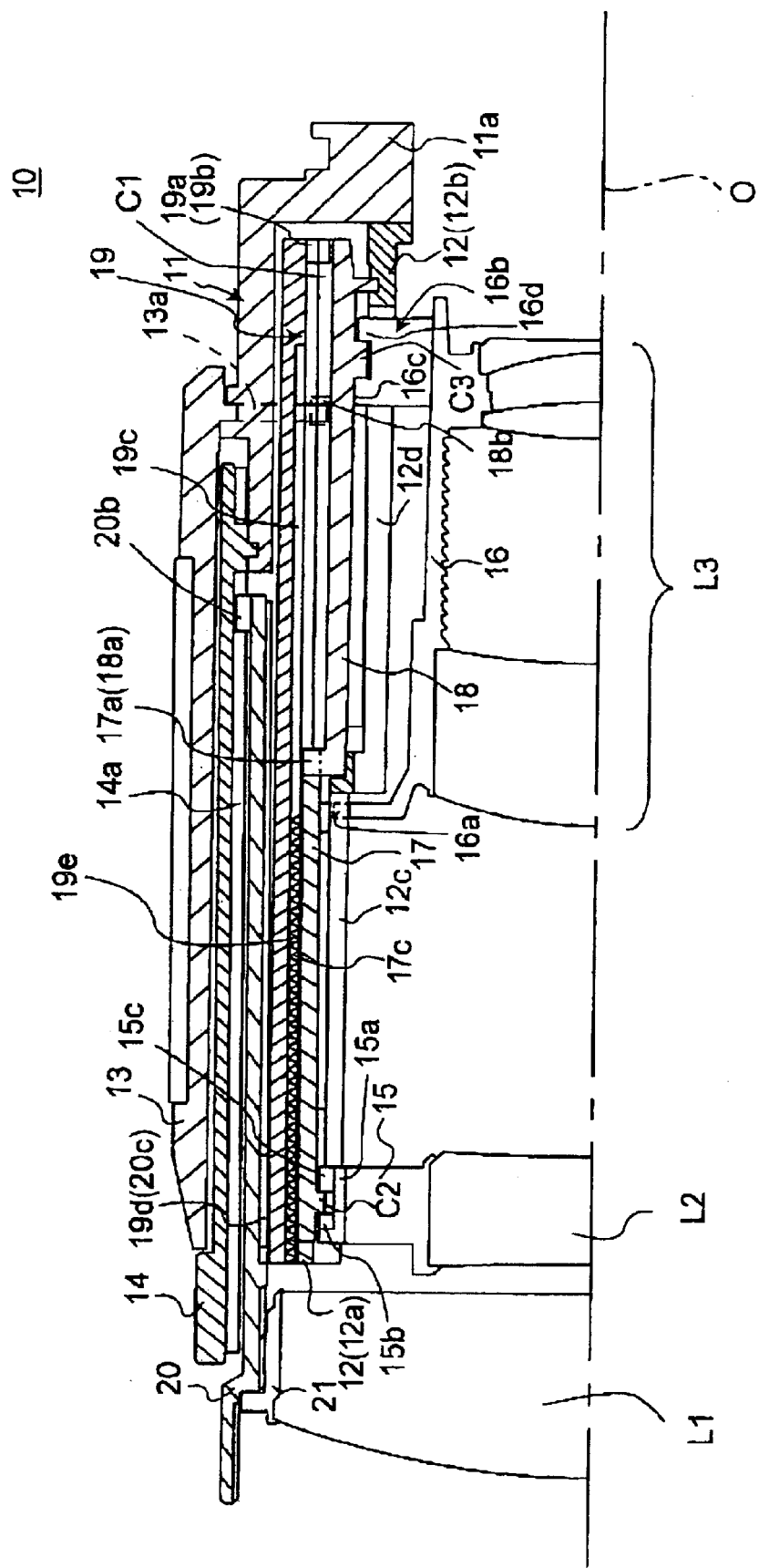
FIG. 1 is a longitudinal cross sectional view of an embodiment of an interchangeable zoom lens which incorporates a cam-rib-incorporated cam mechanism according to the present invention, showing an upper half of the zoom lens from the optical axis thereof.

FIG. 1 shows an embodiment of an interchangeable zoom lens of an SLR camera system, wherein the zoom lens incorporates a cam-rib-incorporated cam mechanism according to the present invention. First of all, the overall structure of the zoom lens 10 will be discussed hereinafter. The zoom lens 10 is provided with a photographing optical system having three lens groups, i.e., a first lens group L1, a second lens group L2 and a third lens group L3 as shown in FIG. 1. In this photographing optical system, all of the first, second and third lens groups L1, L2 and L3 move along an optical axis O to perform a zooming operation, and the first lens group L1 moves along the optical axis O to perform a focusing operation.

The zoom lens 10 is provided with a mount ring 11 serving as a stationary ring. The mount ring 11 is provided at a rear end thereof with a mounting portion 11a which is detachably attached to a camera body (not shown). The zoom lens 10 is provided inside the mount ring 11 with a stationary ring 12 which is fixed to the mount ring 11. The zoom lens 10 is provided around the mount ring 11 with a focus ring (manual operating ring) 14, and is provided around the focus ring 14 with a zoom ring (manual operating ring) 13. The zoom ring 13 and the focus ring 14 are supported by the mount ring 11 to be freely rotatable about the optical axis O without moving along the optical axis O with respect to the mount ring 11.

Figure 2:
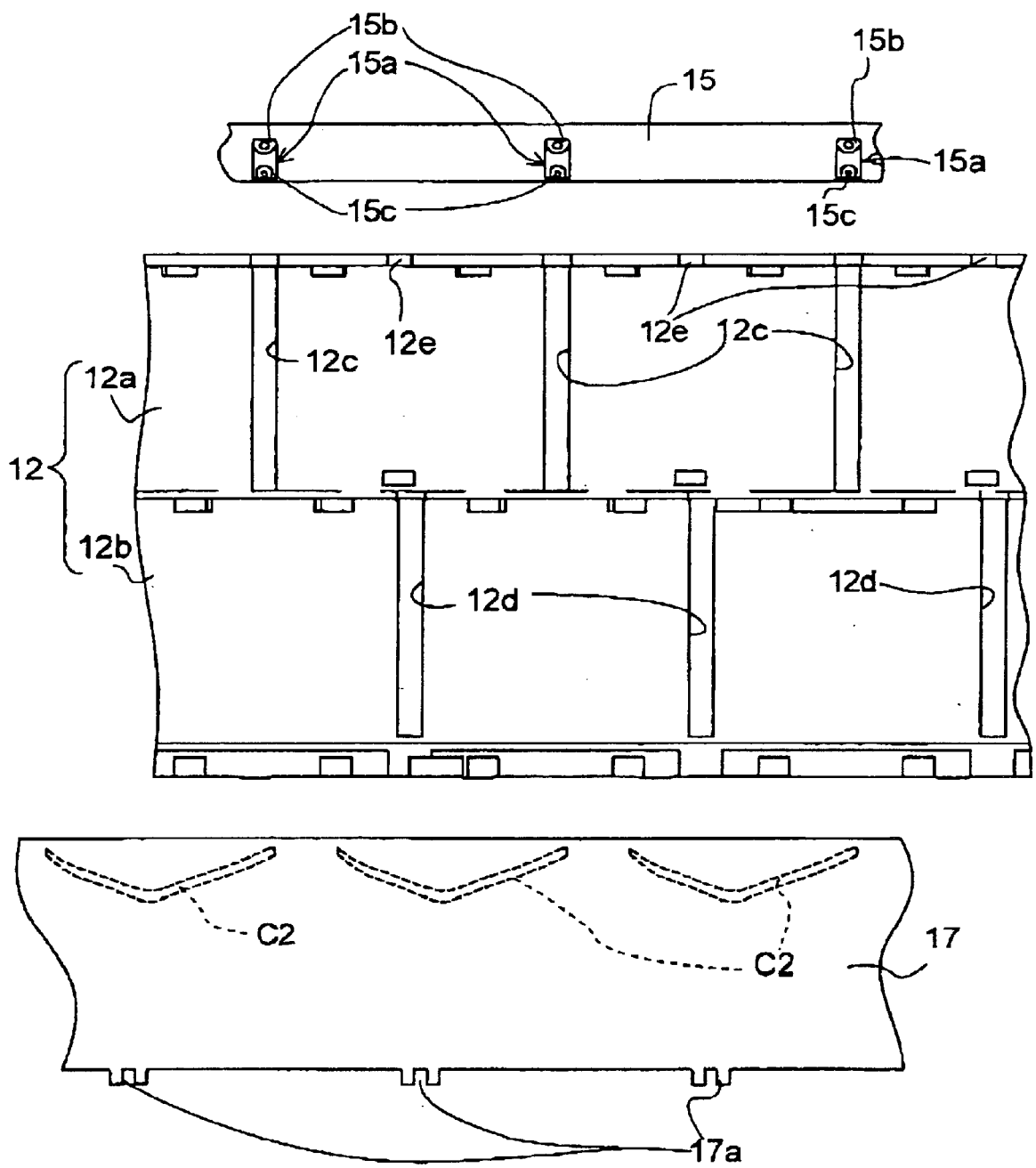
FIG. 2 is an exploded and developed view of a second lens group support ring, a stationary ring and a first cam ring of the zoom lens shown in FIG. 1.

The stationary ring 12 is provided with a front large-diameter portion 12a and a rear small-diameter portion 12b positioned behind the front large-diameter portion 12a. The front large-diameter portion 12a is provided with three front linear guide slots 12c extending parallel to the optical axis O, while the rear small-diameter portion 12b is provided with three rear linear guide slots 12d extending parallel to the optical axis O. The second lens group L2 is fixed to a second lens group support frame 15 to be supported thereby. The second lens group support frame 15 is fitted into the front large-diameter portion 12a. The second lens group support frame 15 is provided on an outer peripheral surface thereof with three linear guide projections 15a which project radially outwards to be slidably engaged in the three front linear guide slots 12c of the front large-diameter portion 12a, respectively (see FIG. 2). Accordingly, the second lens group support frame 15 is guided linearly in the optical axis direction without rotating about the optical axis O with respect to the stationary ring 12 due to the engagement of the three linear guide projections 15a with the three front linear guide slots 12c. The third lens group L3 is fixed to a third lens group support frame 16 to be supported thereby. The third lens group support frame 16 is fitted into the rear small-diameter portion 12b. The third lens group support frame 16 is provided at the front end thereof with three first linear guide projections 16a which project radially outwards to be slidably engaged in the three rear linear guide slots 12c of the front large-diameter portion 12a, respectively, and is further provided in the vicinity of the rear end thereof with three second linear guide projections 16b which project radially outwards to be slidably engaged in the three rear linear guide slots 12d on the rear small-diameter portion 12b. Accordingly, the third lens group support frame 16 is guided linearly in the optical axis direction without rotating about the optical axis O with respect to the stationary ring 12 due to the engagement of the three linear guide projections 16a with the three front linear guide slots 12c and the engagement of the three second linear guide projections 16b with the three rear linear guide slots 12d.

The zoom lens 10 is provided around the stationary ring 12 with a first cam ring 17 and a second cam ring 18. The first cam ring 17 is fitted on the large-diameter portion 12a to be freely rotatable about the optical axis O without moving along the optical axis O with respect to the large-diameter portion 12a, and the second cam ring 18 is fitted on the small-diameter portion 12b to be freely rotatable about the optical axis O without moving along the optical axis O with respect to the small-diameter portion 12b. The first cam ring 17 is provided at a rear end thereof with three pairs of engaging projections 17a (see FIG. 2) which project rearwards, while the second cam ring 18 is provided at a front end thereof with three engaging projections 18a (see FIGS. 3 and 4) which project radially outwards to be engaged with the three pairs of engaging projections 17a, respectively, so that the first cam ring 17 and the second cam ring 18 can integrally rotate at all times. The second cam ring 18 is provided on an outer peripheral surface thereof with a rotation transfer projection 18b which is elongated in a direction parallel to the optical axis O. The zoom ring 13 is provided on an inner peripheral surface thereof with a rotation transfer arm 13a which projects radially inwards to be engaged with the rotation transfer projection 18b of the second cam ring 18. Accordingly, manually rotating the zoom ring 13 causes both the first cam ring 17 and the second cam ring 18 to rotate together with the zoom ring 13 due to the engagement of the rotation transfer arm 13a with the rotation transfer projection 18b.

Figure 3:
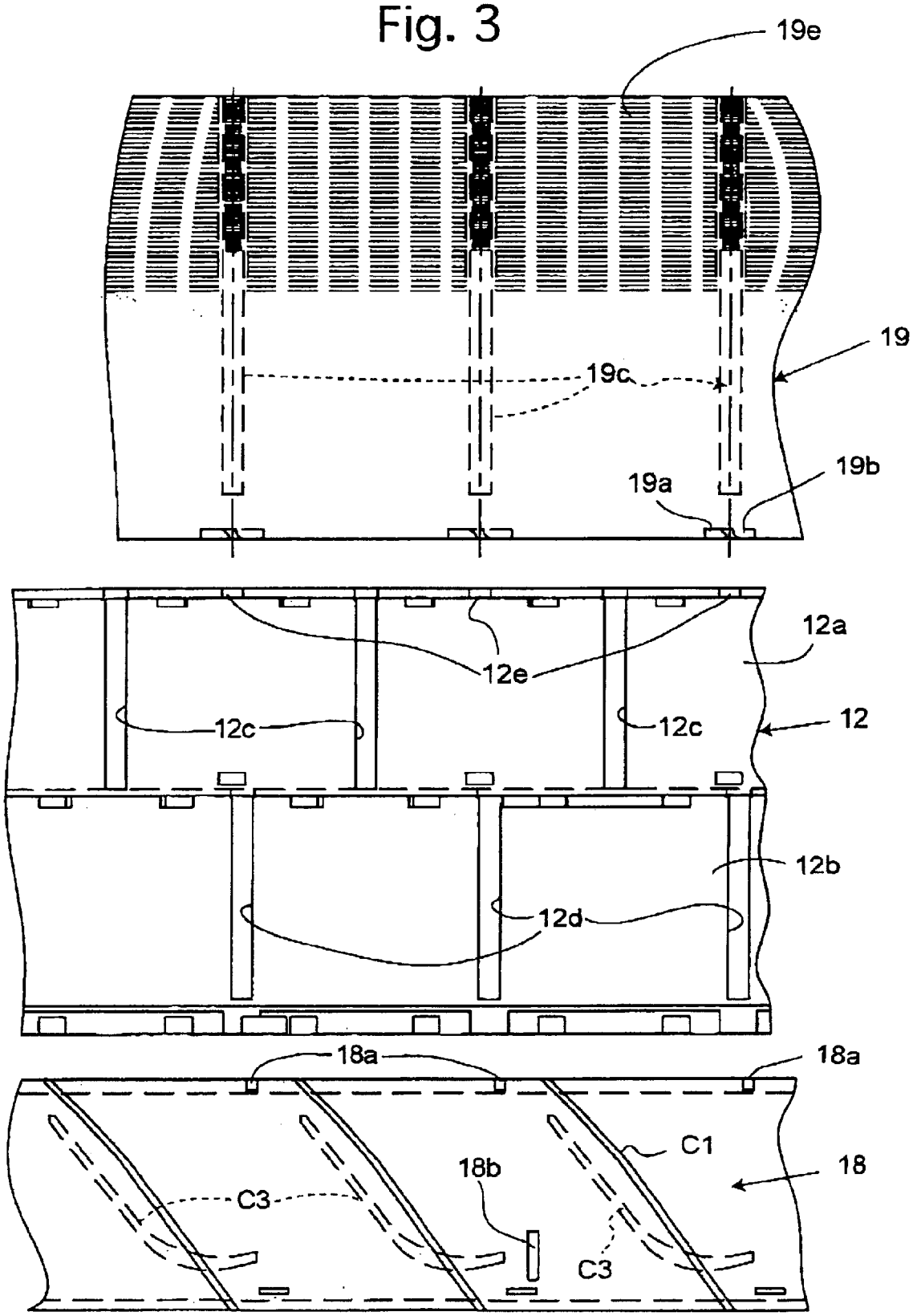
FIG. 3 is an exploded and developed view of a first lens group support ring, the stationary ring and a second cam ring of the zoom lens shown in FIG. 1.
Figure 4:
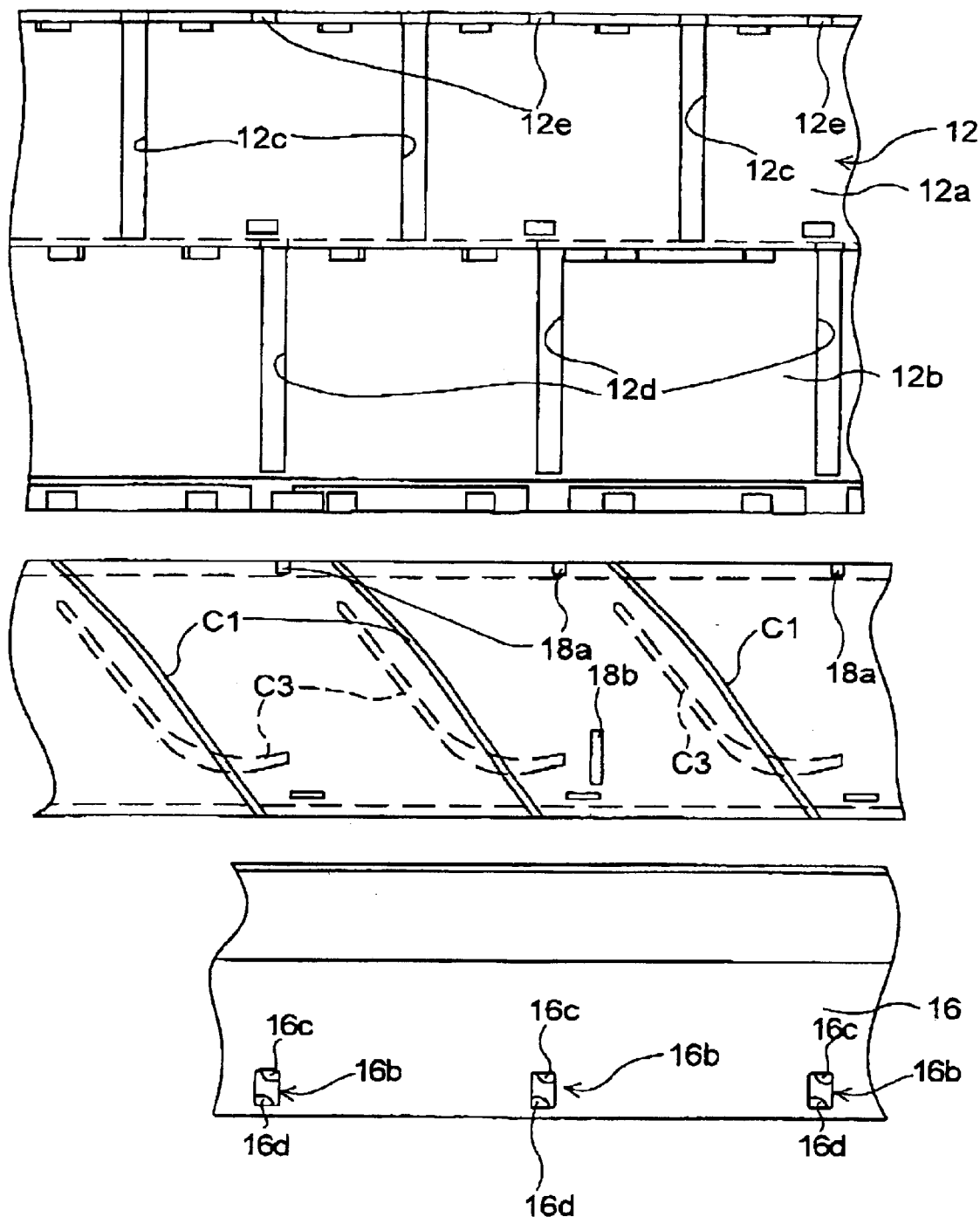
FIG. 4 is an exploded and developed view of the stationary ring, the second cam ring and a third lens group support ring of the zoom lens shown in FIG. 1.

The second cam ring 18 is provided on an outer peripheral surface thereof with three first cam ribs C1, and is provided on an inner peripheral surface of the second cam ring 18 with three third cam ribs C3 (see FIGS. 3 and 4). The first cam ring 17 is provided on an inner peripheral surface thereof with three second cam ribs C2 (see FIG. 2). The zoom lens 10 is provided around the first cam ring 17 and the second cam ring 18 with a first moving ring 19. The first moving ring 19 is provided at the rear end thereof on an inner peripheral surface of the first moving ring 19 with three pairs of cam followers 19a and 19b (see FIG. 3) each pair of which is engaged with the associated first cam rib C1 of the second cam ring 18 in a manner to hold the first cam rib C1 between the pair of cam followers 19*a* and 19*b*.

The first moving ring 19 is provided on an inner peripheral surface thereof with three linear guide grooves 19*c* which extend parallel to the optical axis O. The stationary ring 12 is provided at the front end thereof with three engaging projections 12*e* (see FIGS. 2 and 3) which are engaged in the three linear guide grooves 19*c* of the first moving ring 19, respectively. The first moving ring 19 is provided at the front end thereof on an outer peripheral surface of the first moving ring 19 with a male thread portion 19*d*. The zoom lens 10 is provided around the front of the first moving ring 19 with a first lens group support frame 20. The first lens group support frame 20 is provided on an inner peripheral surface thereof with a female thread portion 20*c* which is engaged with the male thread portion 19*d* of the first moving ring 19. The first lens group L1 is fixed to a lens holder 21 which is screwed into the first lens group support frame 20 to be fixed thereto as shown in FIG.

1. Accordingly, a rotation of the second cam ring 18 (the zoom ring 13) causes the first moving ring 19 (the first lens group L1), which is guided linearly along the optical axis O without rotating about the optical axis O by the engagement of the three engaging projections 12*e* with the three linear guide grooves 19*c*, to move linearly along the optical axis O in accordance with the contours of the three first cam ribs C1.

Each of the three second linear guide projections 16*b* of the third lens group support frame 16 is provided at the end thereof with a pair of cam followers 16*c* and 16*d*, each pair of which is engaged with the associated third cam rib C3 of the second cam ring 18 in a manner to hold the third cam rib C1 between the pair of cam followers 16*c* and 16*d* (see FIG. 4). Likewise, each of the three linear guide projections 15*a* of the second lens group support frame 15 is provided at the end thereof with a pair of cam followers 15*b* and 15*c*, each pair of which is engaged with the associated second cam rib C2 of the second cam ring 18 in a manner to hold the second cam rib C2 between the pair of cam followers 15*b* and 15*c* (see FIG. 2). Since each of the second lens group support frame 15 and the third lens group support frame 16 is guided linearly along the optical axis by the stationary ring 12 without rotating, a rotation of the first cam ring 17 and the second cam ring 18 (a rotation of the zoom ring 13) causes the second lens group support frame 15 (the second lens group L2) to move along the optical axis O in accordance with the contours of the three second cam ribs C2, and further causes the third lens group support frame 16 (the third lens group L3) to move along the optical axis O in accordance with the contours of the three third cam ribs C3 to perform a zooming operation together with the above described linear movement of the first moving ring 19 (the first lens group L1) in accordance with the contours of the three first cam ribs C1.

The first lens group support frame 20 is provided on an outer peripheral surface thereof with three radial projections 20*b* (only one of them appears in FIG. 1) which project radially outwards to be engaged in three rotation transfer grooves 14*a* (only one of them appears in FIG. 1) which are formed on an inner peripheral surface of the focus ring 14 to extend parallel to the optical axis O. Accordingly, manually rotating the focus ring 14 causes the first lens group support frame 20 to move along the optical axis O while rotating about the optical axis O with respect to the first moving ring 19, which is guided linearly along the optical axis O without rotating, due to the engagement of the female thread portion 20*c* with the male thread portion 19*d* to perform a focusing operation.

The first cam ring 17 is provided on an outer peripheral surface thereof with a light-shielding knurled surface 17*c* (see FIG. 1), while the first moving ring 19 is provided, on an inner peripheral surface thereof which faces the light-shielding knurled surface 17*c*, with a light-shielding knurled surface 19*e* (see FIGS. 1 and 3) which faces the light-shielding knurled surface 17*c*.

Figure 5:
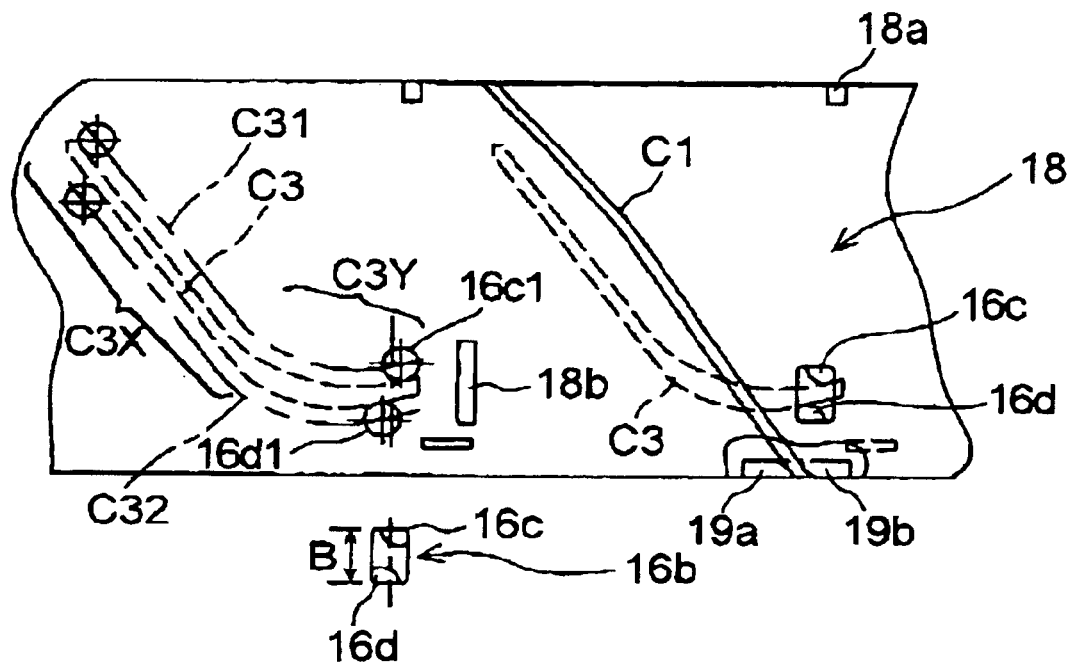
FIG. 5 is developed view of a fundamental portion of the cam-rib-incorporated cam mechanism incorporated in the zoom lens shown in FIG. 1.

The present invention is applied to the cam-rib-incorporated cam mechanism incorporated in the zoom lens 10 which is composed of the three third cam ribs C3 and the three pairs of cam followers 16*c* and 16*d*. This cam-rib-incorporated cam mechanism will be hereinafter discussed in detail with reference to FIGS. 5 and 6. The second cam ring (cam ring) 18, which includes the three cam ribs C3, is made of synthetic resin. Likewise, the third lens group support ring (follower ring) 16, which includes the three pairs of cam followers 16*c* and 16*d*, is also made of synthetic resin. As clearly shown in FIG. 5, each cam rib C3 includes an inclined straight section C3X and a circumferential section C3Y. The inclined straight section C3X extends in a direction inclined to both a circumferential direction of the second cam ring 18 and the axial direction of the second cam ring 18 at an angle of approximately 45 degrees, while the major portion of the circumferential section C3Y extends in substantially a circumferential direction of the second cam ring 18. Each pair of cam followers 16*c* and 16*d* are positioned apart from each other in the optical axis direction. A cam rib having a certain shape such as each cam rib C1 can be held between a pair of cam followers which are positioned apart from each other in a circumferential direction such as each pair of cam followers 19*a* and 19*b*. However, regarding each cam rib C3, which includes the circumferential section C3Y that extends in nearly a circumferential direction of the second cam ring 18, each pair of cam followers 16*c* and 16*d* must be positioned apart from each other in the optical axis direction (the vertical direction as viewed in FIG. 5) to hold the associated cam rib C3. In the present embodiment of the cam-rib-incorporated cam mechanism incorporated in the zoom lens 10, not only each pair of cam followers 16*c* and 16*d* are positioned apart from each other in the optical axis direction but also the central positions of the cam followers 16*c* and 16*d* are offset from each other in a circumferential direction of the second cam ring 18. This structure contributes to a reduction of the width of each cam rib C3.

To determine the shape of each cam rib C3 by an arrangement of the associated pair of cam followers 16*c* and 16*d*, an imaginary circle 16*c*1 which corresponds to a cylindrical surface of the cam follower 16*c* which contacts one of opposite side surfaces (first side surface) of the cam rib C3 and an imaginary circle 16*d*1 which corresponds to a cylindrical surface of the cam follower 16*d* which contacts the other side surface (second side surface) of the cam rib C3 are utilized. A primary cam diagram C31 and a primary cam diagram C32 are delineated by the center of the imaginary circle 16*c*1 and the center of the imaginary circle 16*d*1, respectively, and an area defined by envelopes of the imaginary circles 16*c*1 and 16*d*1 defines the shape of the cam rib C3. In addition to this arrangement, offsetting the central positions of the cam followers 16*c* and 16*d* from each other in a circumferential direction of the third lens group support frame 16 makes it possible to reduce the width of each cam rib C3.

Figure 6:
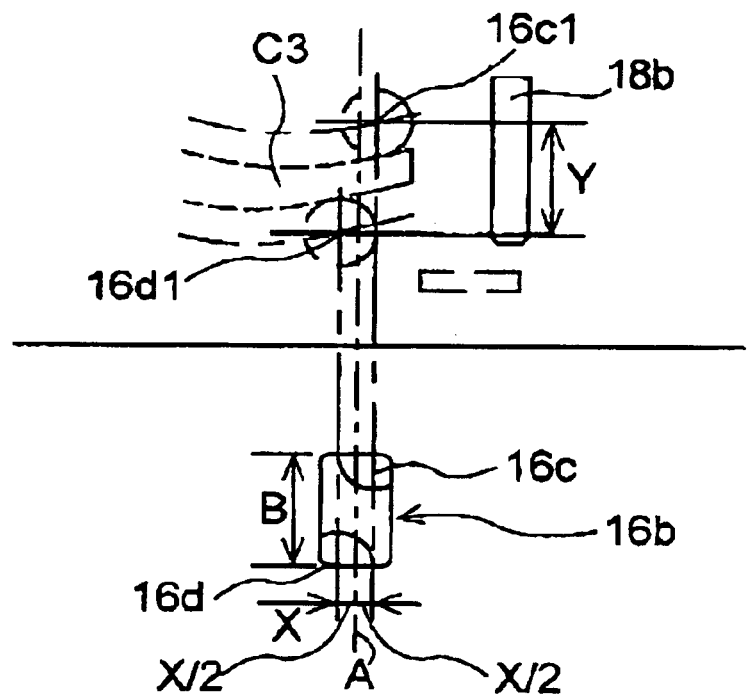
FIG. 6 is an enlarged view of a portion of the drawing shown in FIG. 5.

FIG. 6 shows an enlarged view of the cam followers 16*c* and 16*d* formed on one of the three second linear guide projections 16*b*. As shown in FIG. 6, a center line A of each linear guide projection 16*b* in a widthwise direction thereof (horizontal direction as viewed in FIG. 5) is shown by a one-dot chain line, and the center of the imaginary circle 16*c*1 and the center of the imaginary circle 16*d*1 are offset from the center line A in opposite directions away from each other by the same distance X/2. Namely, the center of the imaginary circle 16c1 and the center of the imaginary circle 16d1 are offset from each other in a circumferential direction of the third lens group support frame 16 by distance X. The center of the imaginary circle 16c1 and the center of the imaginary circle 16d1 are positioned apart from each other in the axial direction of the third lens group support frame 16 (i.e., the vertical direction as viewed in FIG. 5) by distance Y. Optimizing the numerical values of these distances X and Y makes it possible to reduce the width of each cam rib C3.

It is desirable for each pair of cam followers 16c and 16d be molded to be integral with the third lens group support frame 16 by a common mold so that no parting line crosses over the cam followers 16c and 16d. Namely, it is desirable for a molding space for each pair of cam followers 16c and 16d be secured in a mold which is unsplittable thereat. To this end, a surface of each cam follower 16c and 16d which extends radially outwards (i.e. a rise surface of each cam follower 16c and 16d) is made preferably parallel with a radial line which connects the center of the guide projection 16b and the optical axis O.

Figure 7:
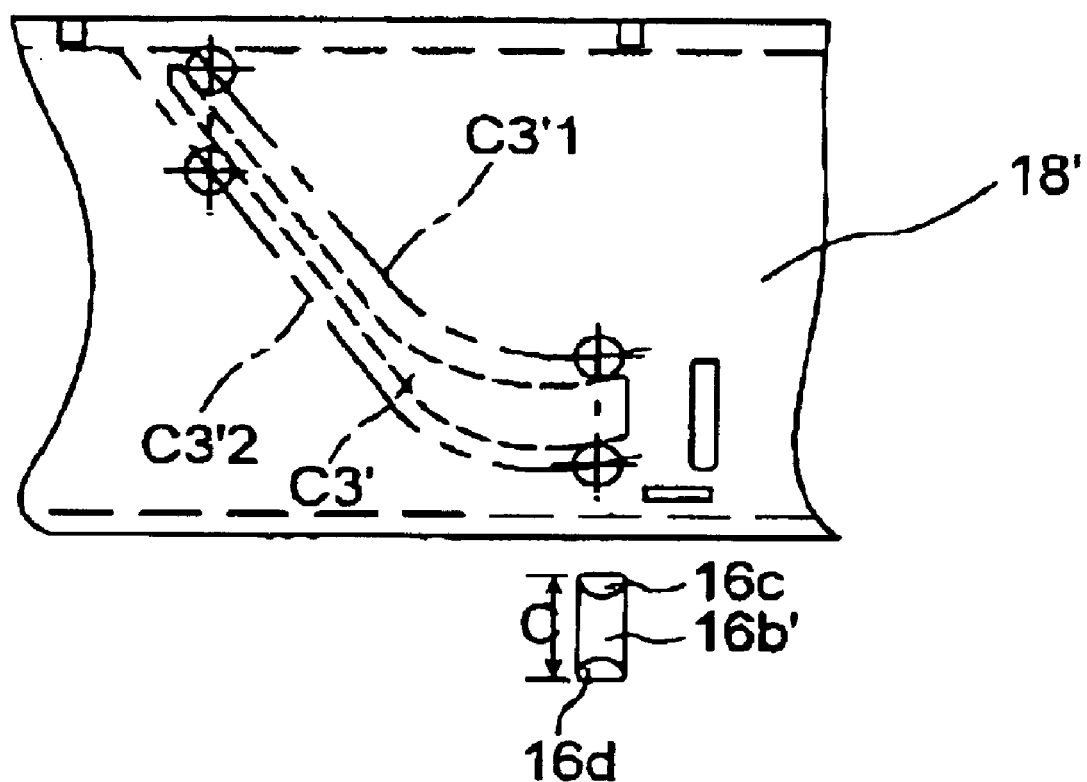
FIG. 7 is a developed view of a fundamental portion of a cam-rib-incorporated cam mechanism incorporated in a conventional zoom lens which is to be compared with the cam-rib-incorporated cam mechanism shown in FIGS. 5 and 6.

FIG. 7 shows a fundamental portion of a cam-rib-incorporated cam mechanism incorporated in a conventional zoom lens. The effect of reducing the width of each cam rib C3 will become apparent by comparing the structure of the fundamental portion the conventional cam-rib-incorporated cam mechanism shown in FIG. 7 with the structure of the fundamental portion of the cam-rib-incorporated cam mechanism according to the present invention shown in FIGS. 5 and 6. Each conventional pair of cam followers 16c' and 16d' are positioned to be simply apart from each other in the optical axis direction (the vertical direction as viewed in FIG. 7) without being offset from each other in a circumferential direction (the horizontal direction as viewed in FIG. 7). In each conventional cam rib C3', the shape of which is determined by such an arrangement of the conventional pair of cam followers 16c' and 16d', it can be seen from FIG. 7 that the width of the cam rib C3', especially the width of the portion of the cam rib C3' which mostly has a circumferential component (which corresponds to the circumferential section C3Y shown in FIG. 5), is very wide. However, in the present invention, the axial length of the second cam ring 18 can be reduced by the cam-rib-incorporated cam mechanism shown in FIGS. 5 and 6. In addition, an axial length B (see FIG. 6) of each linear guide projection 16b, on which the associated pair of cam followers 16c and 16d are formed, can be made shorter than an axial length C of each linear guide projection 16b', on which the associated conventional pair of cam followers 16c' and 16d' are formed. Accordingly, the axial length of the third lens group support frame 16 in the optical axis direction can be reduced; consequently, the axial length of the zoom lens 10 can be reduced.

The present invention can be applied not only to an interchangeable zoom lens such as the above described interchangeable zoom lens 10, but also to two concentrically arranged ring members of any other device which has a cam-rib-incorporated cam mechanism including cam ribs between the two annular members.

The present invention can be applied not only to the case where one or more cam ribs are formed on an inner peripheral surface of a ring member such as the second cam ring 18, but also to the case where one or more cam ribs are formed on an outer peripheral surface of a ring member.

As can be understood from the foregoing, according to the present invention, the width of each cam rib can be reduced in a cam-rib-incorporated cam mechanism which includes a cam ring and a follower ring which are concentrically arranged, wherein cam ribs each extending non-linearly are formed on an inner or outer peripheral surface of the cam ring while a corresponding set of pairs of cam followers are formed on an outer or inner peripheral surface of the follower ring.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A cam mechanism comprising:

a cam ring including at least one cam rib which is formed on a peripheral surface of said cam ring to extend non-linearly; and a follower ring which is concentric with said cam ring, and includes at least one pair of cam followers which are formed on a peripheral surface of said follower ring to be positioned apart from each other in an axial direction of said follower ring to hold said cam rib between said pair of cam followers, wherein central positions of said pair of cam followers are offset from each other in a circumferential direction of said follower ring.

2. The cam mechanism according to claim 1, wherein said cam rib is formed on an outer peripheral surface of said cam ring, and said pair of cam followers are formed on an inner peripheral surface of said follower ring.

3. The cam mechanism according to claim 1, wherein said cam rib is formed on an inner peripheral surface of said cam ring, and said pair of cam followers are formed on an outer peripheral surface of said follower ring.

4. The cam mechanism according to claim 1, wherein said follower ring is molded from synthetic resin, said pair of cam followers being molded to be integral with said follower ring by a common mold.

5. The cam mechanism according to claim 1, wherein said cam ring and said follower ring are elements of a lens barrel, said follower ring being guided linearly along an optical axis of said lens barrel without rotating.

6. The cam mechanism according to claim 5, wherein said lens barrel comprises a linear guide member having at least one linear guide groove for guiding said follower ring linearly along said optical axis without rotating said follower ring, said pair of cam followers being formed on an end of a linear guide projection which is engaged in said linear guide groove.

7. The cam mechanism according to claim 5, wherein said lens barrel serves as a photographing lens.

8. The cam mechanism according to claim 1, wherein said cam rib comprises:

an inclined straight section which extends in a direction inclined to both a circumferential direction of said cam ring and an axial direction of said cam ring, and a circumferential section which extends in substantially said circumferential direction of said cam ring.

9. A cam mechanism comprising:

two concentric rings, at least one of which is rotatable relative to the other;

at least one cam rib formed on one of opposed peripheral surfaces of said two concentric rings;

at least one pair of cam followers formed on the other of said opposed peripheral surfaces to hold said cam rib between said pair of cam followers, wherein central positions of said pair of cam followers are offset from each other in a circumferential direction of said two concentric rings.

10. The cam mechanism according to claim 9, wherein said cam mechanism is incorporated in a photographing lens.

* * * * *